United States Patent
Yang et al.

(10) Patent No.: US 10,808,502 B2
(45) Date of Patent: Oct. 20, 2020

(54) METHOD FOR OPTIMIZING SENSOR NETWORK NODE LOCATION IN GEOLOGICAL $CO_2$ STORAGE AREA

(71) Applicants: China University of Mining and Technology, Xuzhou (CN); Xuzhou Relimap Information Technology Co., Ltd., Xuzhou (CN); Jiangsu Normal University, Xuzhou (CN); Southeast University, Nanjing (CN)

(72) Inventors: Hui Yang, Xuzhou (CN); Li Yang, Xuzhou (CN); Gefei Feng, Xuzhou (CN); Xiaodong Xu, Xuzhou (CN); Yong Qin, Xuzhou (CN); Yaqin Sun, Xuzhou (CN); Hui Ci, Xuzhou (CN); Lifang Xue, Xuzhou (CN)

(73) Assignees: China University of Mining and Technology, Xuzhou (CN); Xuzhou Relimap Informatfon Technology Co., Ltd., Xuzhou (CN); Jiangsu Normal University, Xuzhou (CN); Southeast University, Nanjing (CN)

( * ) Notice: Subject to any disclaimer, the term of this patent is extended or adjusted under 35 U.S.C. 154(b) by 0 days.

(21) Appl. No.: 16/485,116

(22) PCT Filed: Dec. 27, 2017

(86) PCT No.: PCT/CN2017/118951
§ 371 (c)(1),
(2) Date: Aug. 9, 2019

(87) PCT Pub. No.: WO2018/192260
PCT Pub. Date: Oct. 25, 2018

(65) Prior Publication Data
US 2020/0024930 A1 Jan. 23, 2020

(30) Foreign Application Priority Data

Apr. 18, 2017 (CN) .......................... 2017 1 0250916

(51) Int. Cl.
*G01V 11/00* (2006.01)
*E21B 41/00* (2006.01)
(Continued)

(52) U.S. Cl.
CPC .......... *E21B 41/0064* (2013.01); *G01V 1/282* (2013.01); *G01V 11/00* (2013.01); *H04W 16/18* (2013.01); *H04W 84/18* (2013.01)

(58) Field of Classification Search
CPC ... E21B 41/0064; H04W 84/18; H04W 16/18; G01V 11/00; G01V 1/282; G01V 9/00; G01V 99/005; G01S 5/00
(Continued)

(56) References Cited

U.S. PATENT DOCUMENTS

| | | | | |
|---|---|---|---|---|
| 2004/0215428 A1* | 10/2004 | Bras | ........................ | G06T 17/20 703/2 |
| 2012/0047098 A1* | 2/2012 | Reem | .................... | G06T 11/206 706/12 |
| 2014/0340256 A1* | 11/2014 | O'Regan | ................... | G01S 1/68 342/357.51 |

FOREIGN PATENT DOCUMENTS

| | | | |
|---|---|---|---|
| CN | 101383736 A | | 3/2009 |
| CN | 102901536 A | | 1/2013 |
(Continued)

OTHER PUBLICATIONS

Liang Sun and Wenying Chen, Development and application of a multi-stage CCUS source-sink matching model, 2016, Applied Energy 185, pp. 1424-1432.*

(Continued)

*Primary Examiner* — Juan C Ochoa
(74) *Attorney, Agent, or Firm* — Edwin S. Flores; Chalker Flores, LLP (57) ABSTRACT

The present invention discloses a method for optimizing sensor network node location in a geological $CO_2$ storage area. In the method, by analyzing data in a monitoring area, such as geological data, geographical data, and meteorologi-
(Continued)

cal data, analyzing influence factors of a $CO_2$ leakage event and determining a sensitivity partition, designing different coverage control schemes of monitoring sensor network nodes, or intensively or sparsely arranging sensor monitoring nodes, a coverage network is described and optimally expressed on the basis of Delaunay triangulation. In the method for optimizing sensor network node location in a geological carbon dioxide storage area, the arrangement density of wireless sensor network nodes can be dynamically adjusted according to geological and geographical features of a detection area, and the arrangement optimization of a dynamic monitoring sensor network for coal seam carbon dioxide injection area leakage can be realized. The method reduces node redundancy and communication overheads as much as possible, and has strong network coverage and network connectivity.

5 Claims, 6 Drawing Sheets

(51) Int. Cl.
    *G01V 1/28*     (2006.01)
    *H04W 16/18*     (2009.01)
    *H04W 84/18*     (2009.01)

(58) Field of Classification Search
    USPC .................................................. 703/10, 2
    See application file for complete search history.

(56) References Cited

FOREIGN PATENT DOCUMENTS

| | | |
|---|---|---|
| CN | 107172626 A | 9/2017 |
| WO | 2013055359 A1 | 4/2013 |
| WO | 2018192260 A1 | 10/2018 |

OTHER PUBLICATIONS

Sebastian Petsch, Visualization methods for sustainable planning, 2011, 150 pages.*

International Search Report and Written Opinion of the P.R. China National Intellection Property Administration for PCT/CN2017/118951 dated Mar. 19, 2018.

Zhang, X., et al., "Site Selection of CO2 Geology Storage Based on Remote Sensing and GIS Technique," Remote Sensing Information, 30(4), Aug. 31, 2015, pp. 122-124.

* cited by examiner

METHOD FOR OPTIMIZING SENSOR NETWORK NODE LOCATION IN GEOLOGICAL $CO_2$ STORAGE AREA

CROSS-REFERENCE TO RELATED APPLICATIONS

This application is the National Stage of International Application No. PCT/CN2017/118951, filed on Dec. 27, 2017 claiming the priority of CN 201710250916.6, filed on Apr. 18, 2017, the contents of which is incorporated by reference herein.

FIELD OF THE INVENTION

The present invention relates to a wireless sensor network node location method, in particular to a method for optimizing sensor network node location in geological CO2 storage area.

DESCRIPTION OF RELATED ART

Global warming has attracted close attention from the international community. Carbon dioxide, as the most important greenhouse gas, is also main cause of global warming. At present, China has become the second largest emitter of $CO_2$, will rely on non-renewable resources, especially coal, petroleum, natural gas, etc. as main energy sources for a long time, and is the potential largest emitter of $CO_2$. Although $CO_2$ in the atmosphere can be absorbed by vegetation, microorganisms and soil in terrestrial ecosystems, and plankton in marine ecosystems, the effects of biological and other carbon sequestration methods are very limited, so the increase speed of $CO_2$ emission needs to be slowed down by other ways such as geological carbon sequestration. A more direct and effective method is to capture waste $CO_2$ from large point sources and then transport and store the same in a relatively closed geological structure or ocean for a long time, so as to prevent or significantly reduce the anthropogenic emission of $CO_2$ to the atmosphere. However, maintenance of the geologically stored $CO_2$ in a supercritical fluid state has to rely on the pressure of strata. Once the $CO_2$ leaks to the earth's surface through channels such as faults, fissures or oil and gas wells, gas cloud heavier than air will be formed near the earth's surface to severely affect human health, life safety and ecological environments, thus making efforts to fight global warming in vain. To ensure that $CO_2$ can be safely stored underground for a long time, perfect monitoring technologies are needed to provide a guarantee. Accurate monitoring devices can improve cognition and verification on the storage process. The key to verifying the persistence and safety of geological $CO_2$ storage is continuous automatic monitoring. The traditional network monitoring coverage control scheme often randomly or evenly arranges discrete sensor nodes in a monitoring area, but does not solve problems of node arrangement optimization of network coverage in the practical application sense, resulting in an increase and waste of detection cost.

The existing technologies closest to the present invention include:

Patent No. 200810201237.0 discloses an area monitoring oriented optimization method for wireless sensor network node arrangement. This method improves the coverage of a monitoring area from the perspective of target detection function by using a particle swarm optimization algorithm and a Hungarian algorithm, and efficiently solves the problem of high-dimensional optimization faced by wireless sensor network node arrangement optimization. However, the optimization method for wireless sensor network node arrangement has certain limitations in a complex geographical and geological environment of a detection area, and in the optimization method, sensors are distributed in a detection area by airdrop to determine an initial position, and scientificity and accuracy of the airdrop position are difficult to determine.

Patent No. 201310118083.X discloses a wireless sensor network node coverage optimization method. This method employs a differential evolution algorithm to iteratively improve, and meanwhile, further optimize a group by constraining the range of the centers of circles and reducing overlaps of multiple circles, so as to use a few sensors to complete as high area coverage as possible. However, for a geological carbon dioxide storage monitoring sensor coverage network, due to diversification of the geological and geographical environment of the storage area, optimization of the sensor coverage network is concerned with more about different geographical and geological features of different monitoring points in the detection area, the density of monitoring point sensor network nodes, and possible interference factors of different degrees, which may not be realized by the wireless sensor network node coverage optimization method.

SUMMARY OF THE INVENTION

Technical Problem

To overcome the deficiencies in the prior art, the present invention provides a method for optimizing sensor network node location in geological $CO_2$ storage area, which has strong network coverage and network connectivity, and can reduce node redundancy and communication overheads.

Technical Solution

To achieve the above objective, the technical solution adopted by the present invention is:

A method for optimizing sensor network node location in geological $CO_2$ storage area, including the following steps:

step 1) analyzing geological, geographical and meteorological data of the geological $CO_2$ storage area to obtain an influence factor set of a $CO_2$ leakage event of the geological $CO_2$ storage area and determining weights, and then obtaining a sensitivity distribution of the geological $CO_2$ storage area by GIS spatial analysis;

step 2) arranging sensor monitoring nodes by using network coverage control algorithms for different densities according to different sensitivity levels of the geological $CO_2$ storage area; and step 3) performing Delaunay triangulation on a sensor node set arranged in the geological $CO_2$ storage area to complete description and optimal expression of a coverage network.

Further, in the step 1), the specific steps of determining weights are: constructing an environmental sensitivity influence factor evaluation index system of the geological $CO_2$ storage area according to the extracted influence factor set of the $CO_2$ leakage event of the storage area, the evaluation index system consisting of a target layer, a criterion layer and a discrimination layer, wherein a first-level evaluation index is monitoring environmental sensitivity A; second-level evaluation indexes included in the first-level evaluation index include geological reservoir $B_1$, topography $B_2$, and meteorological wind field $B_3$; and third-level evaluation indexes included in the second-level evaluation indexes include burial depth $C_1$, fault activity $C_2$, reservoir permeability $C_3$, reservoir porosity $C_4$, geothermal condition $C_5$, slope $C_6$, aspect $C_7$, mine location $C_8$, land use $C_9$, surface coverage $C_{10}$, soil type $C_{11}$, prevailing wind force $C_{12}$ and prevailing wind direction $C_{13}$; and constructing, according to hierarchy of the influence factors of the evaluation index system, a judgment matrix for calculation and comparison by using an analytic hierarchy process, and obtaining total ranking weights of the last-level index layers relative to the first-level index layer after layer-by-layer iterative calculation.

Further, in the step 1), obtaining the sensitivity distribution of the geological $CO_2$ storage area by the GIS spatial analysis specifically includes the following steps:

a, analyzing geological survey data and mine thematic map data to obtain values of porosity, permeability, geothermal condition, burial depth and fault activity influence factors of a coal reservoir and its surrounding rock of the geological $CO_2$ storage area, spatially overlaying the individual influence factors through weighted overlay by the GIS spatial analysis to obtain a potential $CO_2$ leakage channel of the geological $CO_2$ storage area, and performing buffer analysis on the potential $CO_2$ leakage channel to obtain influence degree and spatial distribution status layers of the $CO_2$ leakage;

b, confirming geographical location and range of the geological $CO_2$ storage area on the basis of acquired digital elevation model data of the geological $CO_2$ storage area, and collecting natural geographical features of the geological $CO_2$ storage area; performing slope and aspect analysis by using the acquired digital elevation model data to obtain a topographic slope map and a topographic aspect map; and performing grid reclassification on the topographic slope map and the topographic aspect map respectively to obtain a slope grading map and an aspect classification map, wherein classification criteria are: defining a slope of less than 15° as a gentle slope and a slope of more than or equal to 15° as a steep slope in the topographic slope map, and dividing the aspect into 8 directions, southward, northward, eastward, westward, southeastward, southwestward, northeastward and northwestward, in the topographic aspect map;

extracting a land use status, a soil resource type and a vegetation coverage status of the geological $CO_2$ storage area on the basis of remote sensing data, confirming relative locations of the geological $CO_2$ storage area, an urban settlement and other anthropogenic $CO_2$ emission sources on site, analyzing distances between the relative locations, and performing grid reclassification on analysis results according to four distance levels to obtain anthropogenic $CO_2$ emission source influence range layers;

c, extracting minimum, average and maximum wind speeds in the geological $CO_2$ storage area, coding a prevailing wind direction in the geological $CO_2$ storage area, and generating spatial wind field distribution layers of a windward slope, a leeward slope and a downwind slope in combination with the topographic slope map and the topographic aspect map; then drawing a sector area in downwind direction of a mine as a leakage diffusion accumulation area distribution by taking the location of the mine as an origin and the prevailing wind direction as an axis, the sector area including the whole geological $CO_2$ storage area; and d, by using ArcGIS geographic information processing software, performing weighted overlay on the influence degree and spatial distribution status layers of the $CO_2$ leakage, the anthropogenic $CO_2$ emission source influence range layers and the spatial wind field distribution layers of the windward slope, the leeward slope and the downwind slope by the GIS spatial analysis according to the weights obtained by the evaluation index system to calculate a comprehensive leakage monitoring sensitivity index of each evaluation unit respectively to obtain the sensitivity distribution of the geological $CO_2$ storage area, and reclassifying the sensitivity distribution by five levels to obtain a spatial distribution of the sensitivity levels of the geological $CO_2$ storage area, the sensitivity levels being high sensitivity, relatively high sensitivity, normal sensitivity, relatively low sensitivity and low sensitivity, respectively.

Further, the step 2) specifically includes: assuming that each sensor node implements all-directional monitoring, its coverage is used as a circular area having a sensing radius of r, and each sensor node has the same transmitting power, that is, detection radii r of all the sensor nodes are equal; indirectly expressing a coverage density with distance a between the sensor nodes, increasing sensor nodes in six directions by taking the sensor nodes as centers and the distances a between the sensor nodes as side lengths of grids according to the different sensitivity levels of the geological $CO_2$ storage area to perform regular triangulation on the geological $CO_2$ storage area, and satisfy a condition that if the sensitivity level of the geological $CO_2$ storage area is higher, the distance a between the sensor nodes is smaller.

Further, the step 3) includes the following specific steps:

a, constructing initial Delaunay triangulation with $CO_2$ injection wells as cluster head nodes, and solving an initial Voronoi domain of the cluster head nodes;

b, taking the cluster head nodes as initial growth points, selecting, according to the monitoring sensitivity level of an area where the initial growth points are located, the different distances a between the sensor nodes for grid arrangement, calculating spatial locations of to-be-increased sensor node point sets from six directions by taking equilateral triangles as grid division units and the initial growth points as centers, successively judging whether the to-be-increased sensor nodes are within the Voronoi, adding the sensor nodes falling within the Voronoi domain into a growth point set, and performing sensitivity judgment again on the increased sensor nodes as new growth points till the to-be-increased sensor node point sets of all the growth nodes within the Voronoi domain are outside the Voronoi domain; and c, solving a Delaunay monitoring network optimization coverage control scheme in combination with the cluster head nodes and the sensor nodes. Advantageous Effects: In the method of the invention, an influence factor set of a leakage event is analyzed according to data in a geological $CO_2$ storage area, such as geological data, geographical data and meteorological data, and variable density node arrangement is used to optimize wireless network sensor node arrangement schemes for different storage areas, so that the method has strong network coverage and network connectivity, and can reduce node redundancy and communication overheads. The method can reduce arrangement cost, improve monitoring quality, prolong life time, and improve timeliness, predictability and effectiveness of leakage monitoring and warning.

BRIEF DESCRIPTION OF THE DRAWINGS

Note: ● in the drawings shows arrangement locations of the sensor nodes.

DETAILED DESCRIPTION OF THE INVENTION

The present invention will be further described below in conjunction with the accompanying drawings.

In the present invention, a coal seam $CO_2$ injection area 5000 m*4000 m in

Qinshui Basin is used as a monitoring simulation area, grids with resolution of 100 m*100 m are used for monitoring sensitivity analysis, 14$CH_4$ exploited wells are used as cluster head nodes for routine monitoring, sensing radii r of sensor nodes are 100 m, and a monitoring scenario is arranged according to monitoring sensitivity optimization arrangement algorithms.

Figure 1:
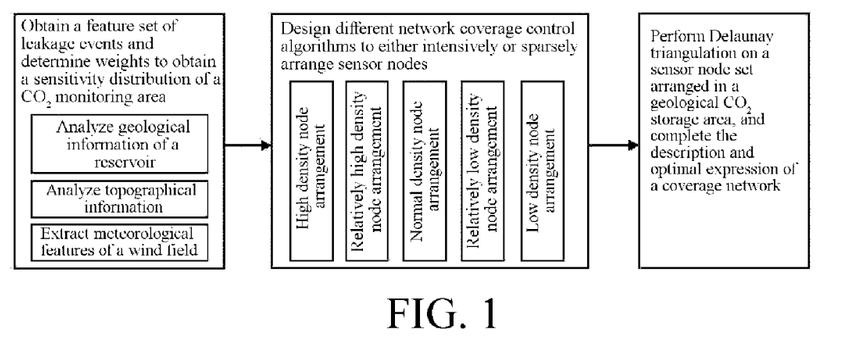
FIG. 1 is a flow diagram of a method for optimizing sensor network node location in geological $CO_2$ storage area according to the present invention.

FIG. 1 shows a main flow diagram of a method for optimizing sensor network node location in geological $CO_2$ storage area according to the present invention. First, geological, geographical and meteorological data of the geological $CO_2$ storage area are analyzed to obtain an influence factor set of a $CO_2$ leakage event of the geological $CO_2$ storage area and determine weights, and then, a sensitivity distribution of the geological $CO_2$ storage area is obtained by GIS spatial analysis. Second, coverage control schemes of monitoring sensor network nodes of different densities are designed, and the sensor monitoring nodes are either intensively or sparsely arranged by using network coverage control algorithms for different densities according to different sensitivity levels of the storage area. Finally, Delaunay triangulation is performed on a sensor node set arranged in the geological $CO_2$ storage area, and the description and optimal expression of a coverage network are completed.

As shown in Table 1, the specific step of determining weights is: constructing an environmental sensitivity influence factor evaluation index system of the geological $CO_2$ storage area according to the extracted influence factor set of the $CO_2$ leakage event of the storage area. The evaluation index system consists of a target layer, a criterion layer and a discrimination layer, wherein a first-level evaluation index is monitoring environmental sensitivity A; second-level evaluation indexes included in the first-level evaluation index include geological reservoir $B_1$, topography $B_2$, and meteorological wind field $B_3$; and third-level evaluation indexes included in the second-level evaluation indexes include burial depth $C_1$, fault activity $C_2$, reservoir permeability $C_3$, reservoir porosity $C_4$, geothermal condition $C_5$, slope $C_6$, aspect $C_7$, mine location $C_8$, land use $C_9$, surface coverage $C_{10}$, soil type $C_{11}$, prevailing wind force $C_{12}$ and prevailing wind direction $C_{13}$.

TABLE 1

Leakage monitoring sensitivity influence factor system table of geological $CO_2$ storage area

| Criterion layer | Index layer | Data source |
|---|---|---|
| Geological reservoir $B_1$ | Burial depth $C_1$ | Geological survey data |
| | Fault activity $C_2$ | Geological survey data |
| | Reservoir permeability $C_3$ | Geological survey data |
| | Reservoir porosity $C_4$ | Soil analysis data |
| | Geothermal condition $C_5$ | Soil analysis data |
| Topography $B_2$ | Mine location $C_6$ | Thematic map data |
| | Slope $C_7$ | Digital elevation model data |
| | Aspect $C_8$ | Digital elevation model data |
| | Land use $C_9$ | Aerial remote sensing data |
| | Surface coverage $C_{10}$ | Aerial remote sensing data |
| | Soil type $C_{11}$ | Soil analysis data |
| Meteorological wind field $B_3$ | Prevailing wind force $C_{12}$ | Meteorological observation data |
| | Prevailing wind direction $C_{13}$ | Meteorological observation data |

The influence of each influence factor on the sensitivity of the storage area is not the same. According to hierarchy of the influence factors of the evaluation index system, a judgment matrix is constructed by using an analytic hierarchy process for calculation and comparison, and total ranking weights of the last-level index layers relative to the first-level index layer are obtained after layer-by-layer iterative calculation, as shown in Table 2.

TABLE 2

Total ranking weights of third-level index layers (C)

| Index | Weight | Index | Weight | Index | Weight | Index | Weight |
|---|---|---|---|---|---|---|---|
| $C_1$ | 0.0177 | $C_2$ | 0.0632 | $C_3$ | 0.0325 | $C_4$ | 0.0304 |
| $C_5$ | 0.0199 | $C_6$ | 0.2109 | $C_7$ | 0.0435 | $C_8$ | 0.0436 |
| $C_9$ | 0.1215 | $C_{10}$ | 0.0867 | $C_{11}$ | 0.0329 | $C_{12}$ | 0.1486 |
| $C_{13}$ | 0.1486 | | | | | | |

Figure 2:
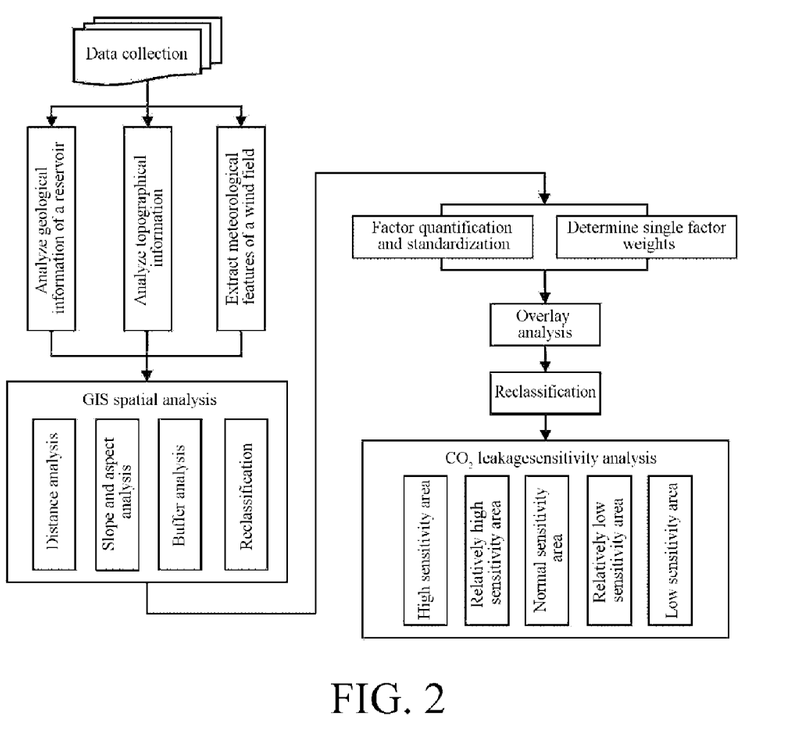
FIG. 2 is a technical route diagram about determining a leakage sensitivity partition of the geological $CO_2$ storage area according to the present invention.
Figure 3:
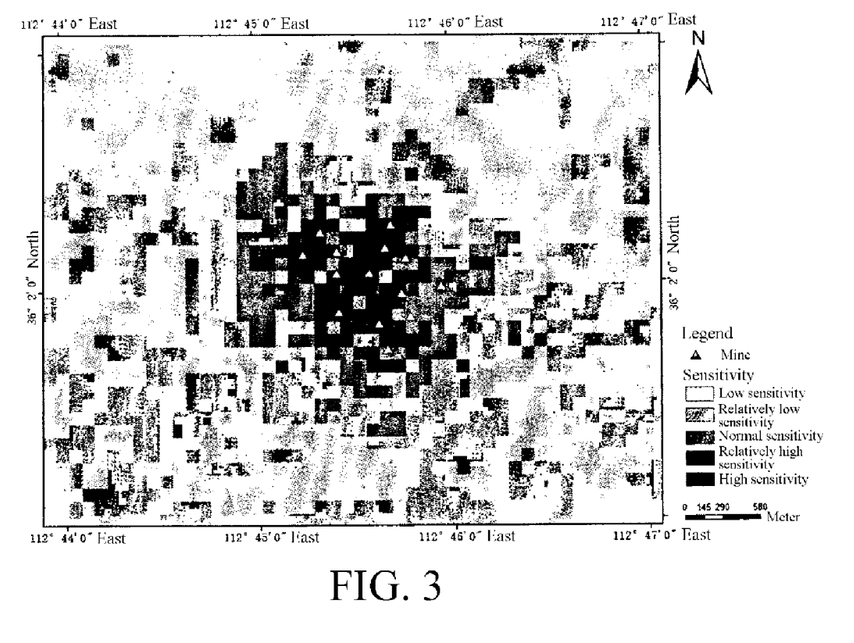
FIG. 3 is a diagram about determining a leakage sensitivity partition of the geological $CO_2$ storage area according to the present invention.

As shown in FIG. 2, the sensitivity distribution of the geological $CO_2$ storage area is obtained by the GIS spatial analysis, specifically including the following steps:

a, analyzing geological survey data and mine thematic map data to obtain values of porosity, permeability, geothermal condition, burial depth and fault activity influence factors of a coal reservoir and its surrounding rock of the geological $CO_2$ storage area, spatially overlaying the individual influence factors through weighted overlay by the GIS spatial analysis to obtain a potential $CO_2$ leakage channel of the geological $CO_2$ storage area, and performing buffer analysis on the potential $CO_2$ leakage channel to obtain influence degree and spatial distribution status layers of the $CO_2$ leakage;

b, confirming geographical location and range of the geological $CO_2$ storage area on the basis of acquired digital elevation model data of the geological $CO_2$ storage area, and collecting natural geographical features of the geological $CO_2$ storage area; performing slope and aspect analysis by using the acquired digital elevation model data to obtain a topographic slope map and a topographic aspect map; and performing grid reclassification on the topographic slope map and the topographic aspect map respectively to obtain a slope grading map and an aspect classification map, wherein classification criteria are: defining a slope of less than 15° as a gentle slope and a slope of more than or equal to 15° as a steep slope in the topographic slope map, and dividing the aspect into 8 directions, southward, northward, eastward, westward, southeastward, southwestward, northeastward and northwestward, in the topographic aspect map;

extracting a land use status, a soil resource type and a vegetation coverage status of the geological $CO_2$ storage area on the basis of remote sensing data, confirming relative locations of the geological $CO_2$ storage area, an urban settlement and other anthropogenic $CO_2$ emission sources on site, analyzing distances between the relative locations, and performing grid reclassification on analysis results according to four distance levels to obtain anthropogenic $CO_2$ emission source influence range layers;

c, extracting minimum, average and maximum wind speeds in the geological $CO_2$ storage area, coding a prevailing wind direction in the geological $CO_2$ storage area, and generating spatial wind field distribution layers of a windward slope, a leeward slope and a downwind slope in combination with the topographic slope map and the topographic aspect map; then drawing a sector area in downwind direction of a mine as a leakage diffusion accumulation area distribution by taking the location of the mine as an origin and the prevailing wind direction as an axis, the sector area including the whole geological $CO_2$ storage area; and d, by using ArcGIS10.2 geographic information processing software, performing weighted overlay on the influence degree and spatial distribution status layers of the $CO_2$ leakage, the anthropogenic $CO_2$ emission source influence range layers and the spatial wind field distribution layers of the windward slope, the leeward slope and the downwind slope by the GIS spatial analysis according to the weights obtained by the evaluation index system to calculate a comprehensive leakage monitoring sensitivity index of each evaluation unit respectively to obtain the sensitivity distribution of the geological $CO_2$ storage area, wherein each grid in the monitoring area is one evaluation unit; and reclassifying the sensitivity distribution by five levels to obtain a spatial distribution of the sensitivity levels of the geological $CO_2$ storage area, the sensitivity levels being high sensitivity, relatively high sensitivity, normal sensitivity, relatively low sensitivity and low sensitivity, respectively, so as to qualitatively give a leakage monitoring sensitivity quantitative partition scheme of the coal seam $CO_2$ injection area, as shown in FIG. 3.

Figure 4:
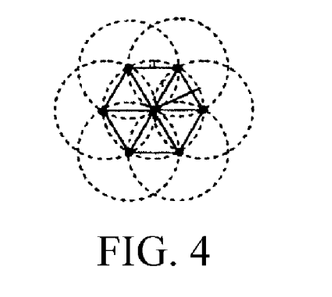
FIG. 4 is an effect diagram of a high density node arrangement of a variable density sensor node arrangement model according to the present invention.
Figure 5:
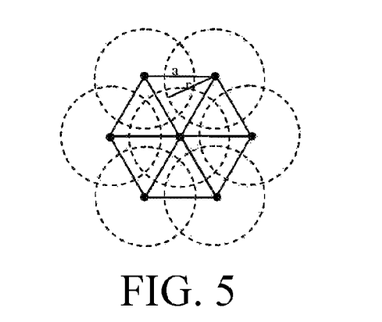
FIG. 5 is an effect diagram of a relatively high density node arrangement of the variable density sensor node arrangement model according to the present invention.
Figure 6:
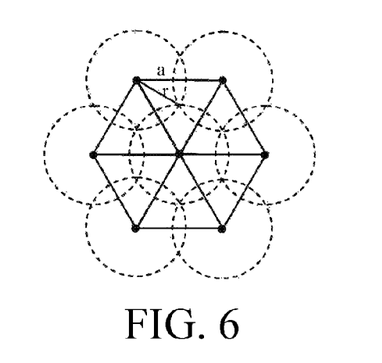
FIG. 6 is an effect diagram of a normal density node arrangement of the variable density sensor node arrangement model according to the present invention.
Figure 7:
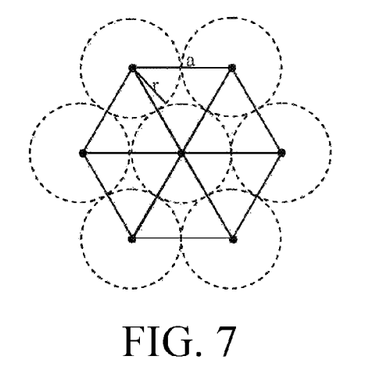
FIG. 7 is an effect diagram of a relatively low density node arrangement of the variable density sensor node arrangement model according to the present invention.
Figure 8:
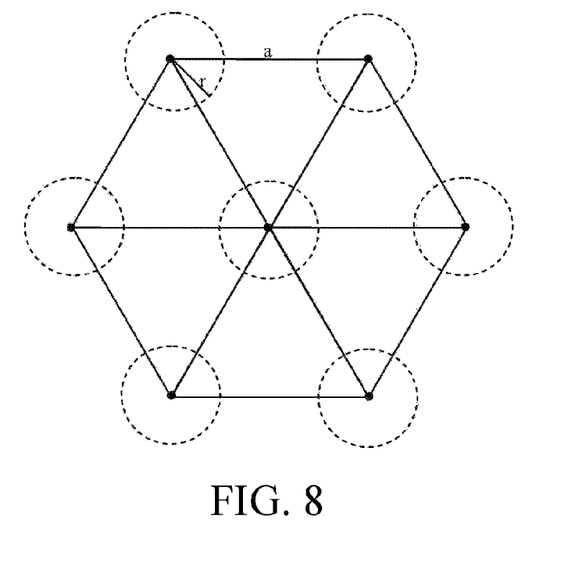
FIG. 8 is an effect diagram of a low density node arrangement of the variable density sensor node arrangement model according to the present invention.

According to different sensitivities of the storage area, different network coverage control algorithms are designed to either intensively or sparsely arrange the sensor nodes. If the sensitivity level of the geological $CO_2$ storage area is higher, the distance a between the sensor nodes is smaller. It is assumed that each sensor node implements all-directional monitoring, its coverage is used as a circular area having a sensing radius of r, and each sensor node has the same transmitting power, that is, detection radii r of all the sensor nodes are equal; a coverage density is indirectly expressed with the distance a between the sensor nodes, and sensor nodes are increased in six directions by taking the sensor nodes as centers and the distances a between the sensor nodes as side lengths of the grids according to the different sensitivities of the geological $CO_2$ storage area to perform regular triangulation on the geological $CO_2$ storage area and satisfy a condition that if the sensitivity level of the geological $CO_2$ storage area is higher, the distance a between the sensor nodes is smaller. That is, high density node arrangement (a=r) is used for a high sensitivity area, as shown in FIG. 4; relatively high density node arrangement (a=$\sqrt{2}$r) is used for a relatively high sensitivity area, as shown in FIG. 5; normal density node arrangement (a=$\sqrt{3}$r) is used for a normal sensitivity area, as shown in FIG. 6; relatively low density node arrangement (a=2r) and low density node arrangement (a=4r) are respectively used for a relatively low sensitivity area and a low sensitivity area, as shown in FIG. 7 and FIG. 8. If one needs to know $CO_2$ concentration of an uncovered area, it may be obtained by spatial interpolation.

Figure 9:
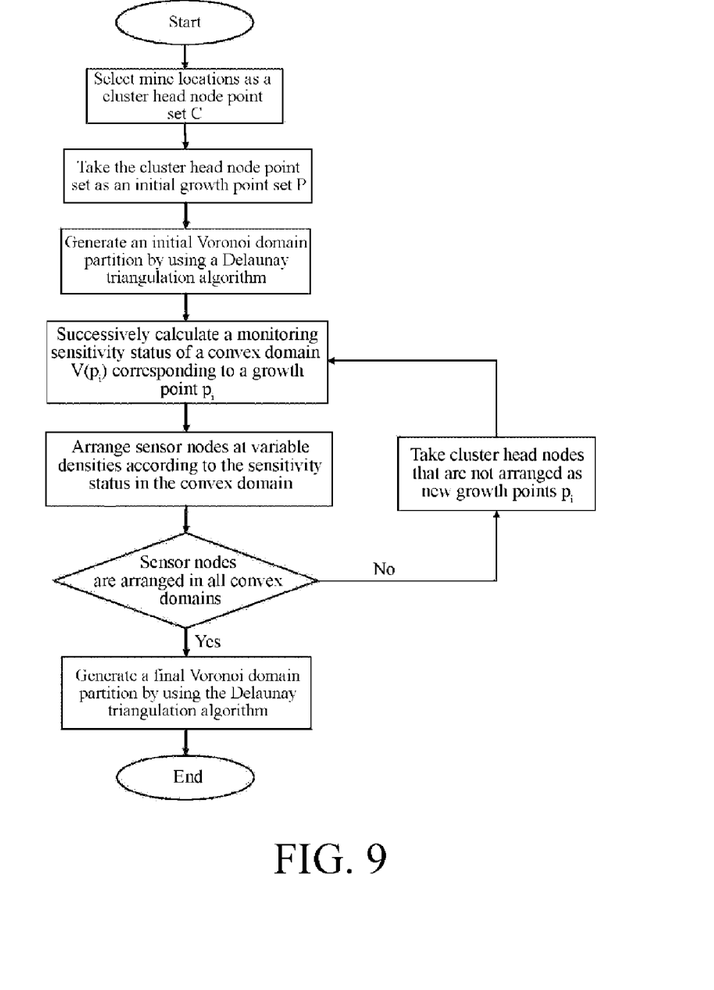
FIG. 9 is a flow diagram of variable density network optimization coverage algorithms according to the present invention.
Figure 10:
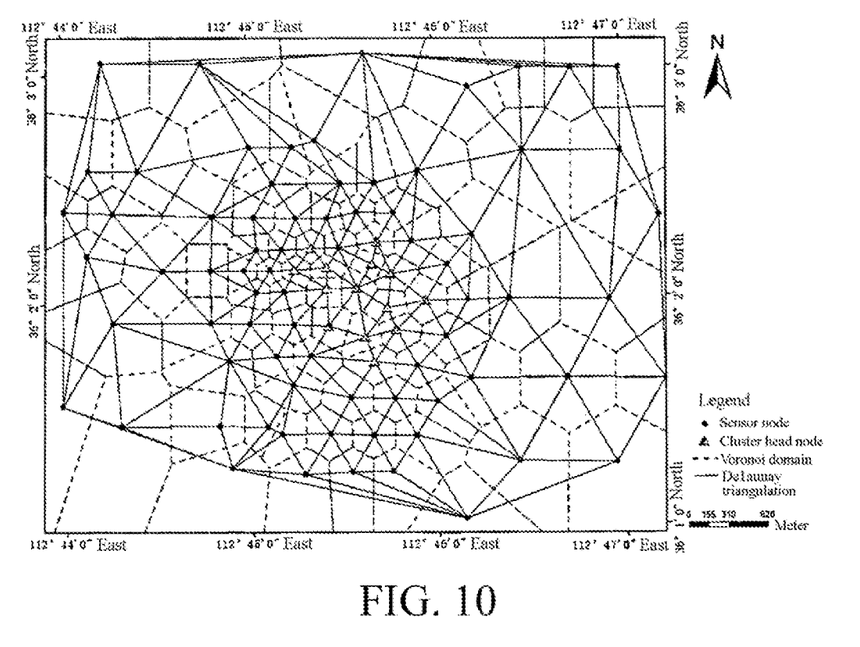
FIG. 10 is an effect diagram of a monitoring network optimization arrangement scenario of a simulation area coal seam $CO_2$ storage area according to the present invention.

As shown in FIG. 9, initial Delaunay triangulation is constructed by using $CO_2$ injection wells as cluster head nodes, and an initial Voronoi domain of the cluster head nodes is solved; the cluster head nodes are taken as initial growth points, according to the monitoring sensitivity level of an area where the initial growth points are located, the different distances a between the sensor nodes are selected for grid arrangement, spatial locations of to-be-increased sensor node point sets are calculated from six directions by taking equilateral triangles as grid division units and the initial growth points as centers, to successively judge whether the to-be-increased sensor nodes are within the Voronoi, the sensor nodes falling within the Voronoi domain are added into a growth point set, and the sensitivity judgment is performed again on the increased sensor nodes as new growth points till the to-be-increased sensor node point sets of all the growth nodes within the Voronoi domain are outside the Voronoi domain. A Delaunay monitoring network optimization coverage control scheme is solved in combination with the cluster head nodes and the sensor nodes, and the result is shown in FIG. 10.

The foregoing descriptions are merely preferred embodiments of the present invention. It should be noted that several improvements and modifications to the present invention can be further made by persons of ordinary skill in the art without departing from the principles of the present invention, and the improvements and modifications should also be regarded as the scope of protection of the present invention.

What is claimed is:

1. A method for optimizing sensor network node location in geological carbon dioxide (CO2) storage area, comprising the following steps:

step 1) analyzing geological, geographical and meteorological data of the geological CO2 storage area to obtain an influence factor set of a CO2 leakage event of the geological CO2 storage area and determining weights, and then obtaining a sensitivity distribution of the geological CO2 storage area by geographic information system (GIS) spatial analysis;

step 2) arranging sensor monitoring nodes by using network coverage control algorithms for different densities according to different sensitivity levels of the geological CO2 storage area; and step 3) performing Delaunay triangulation on a sensor node set arranged in the geological CO2 storage area to complete description and optimal expression of a coverage network.

2. The method for optimizing sensor network node location in geological CO2 storage area according to claim 1, wherein in the step 1), the specific steps of determining weights are: constructing an environmental sensitivity influence factor evaluation index system of the geological CO2 storage area according to the influence factor set of the CO2 leakage event of the geological CO2 storage area, the evaluation index system consisting of a target layer, a criterion layer and a discrimination layer, wherein a first-level evaluation index is monitoring environmental sensitivity A; second-level evaluation indexes comprised in the first-level evaluation index comprise geological reservoir B1, topography B2, and meteorological wind field B3; and third-level evaluation indexes comprised in the second-level evaluation indexes comprise burial depth C1, fault activity C2, reservoir permeability C3, reservoir porosity C4, geothermal condition C5, slope C6, aspect C7, mine location C8, land use C9, surface coverage C10, soil type C11, prevailing wind force C12 ad prevailing wind direction C13; and constructing, according to hierarchy of the influence factors of the evaluation index system, a judgment matrix for calculation and comparison by using an analytic hierarchy process, and obtaining total ranking weights of the last-level index layers relative to the first-level index layer after layer-by-layer iterative calculation.

3. The method for optimizing sensor network node location in geological CO2 storage area according to claim 2, wherein in the step 1), obtaining the sensitivity distribution of the geological CO2 storage area by the GIS spatial analysis specifically comprises the following steps:
   a, analyzing geological survey data and mine thematic map data to obtain values of porosity, permeability, geothermal condition, burial depth and fault activity influence factors of a coal reservoir and its surrounding rock of the geological CO2 storage area, spatially overlaying the individual influence factors through weighted overlay by the GIS spatial analysis to obtain a potential CO2 leakage channel of the geological CO2 storage area, and performing buffer analysis on the potential CO2 leakage channel to obtain influence degree and spatial distribution status layers of the CO2 leakage;
   b, confirming geographical location and range of the geological CO2 storage area on the basis of acquired digital elevation model data of the geological CO2 storage area, and collecting natural geographical features of the geological CO2 storage area; performing slope and aspect analysis by using the acquired digital elevation model data to obtain a topographic slope map and a topographic aspect map; and performing grid reclassification on the topographic slope map and the topographic aspect map respectively to obtain a slope grading map and an aspect classification map, wherein classification criteria are: defining a slope of less than 15° as a gentle slope and a slope of more than or equal to 15° as a steep slope in the topographic slope map, and dividing the aspect into 8 directions, southward, northward, eastward, westward, southeastward, southwestward, northeastward and northwestward, in the topographic aspect map;
   extracting a land use status, a soil resource type and a vegetation coverage status of the geological CO2 storage area on the basis of remote sensing data, confirming relative locations of the geological CO2 storage area, an urban settlement and other anthropogenic CO2 emission sources on site, analyzing distances between the relative locations, and performing grid reclassification on analysis results according to four distance levels to obtain anthropogenic CO2 emission source influence range layers;
   c, extracting minimum, average and maximum wind speeds in the geological CO2 storage area, coding a prevailing wind direction in the geological CO2 storage area, and generating spatial wind field distribution layers of a windward slope, a leeward slope and a downwind slope in combination with the topographic slope map and the topographic aspect map; then drawing a sector area in downwind direction of a mine as a leakage diffusion accumulation area distribution by taking the location of the mine as an origin and the prevailing wind direction as an axis, the sector area comprising the whole geological CO2 storage area; and
   d, by using geographic information processing software, performing weighted overlay on the influence degree and spatial distribution status layers of the CO2 leakage, the anthropogenic CO2 emission source influence range layers and the spatial wind field distribution layers of the windward slope, the leeward slope and the downwind slope by the GIS spatial analysis according to the weights obtained by the evaluation index system to calculate a comprehensive leakage monitoring sensitivity index of each evaluation unit respectively to obtain the sensitivity distribution of the geological CO2 storage area, and reclassifying the sensitivity distribution by five levels to obtain a spatial distribution of the sensitivity levels of the geological CO2 storage area, the sensitivity levels being high sensitivity, relatively high sensitivity, normal sensitivity, relatively low sensitivity and low sensitivity, respectively.

4. The method for optimizing sensor network node location in geological CO2 storage area according to claim 1, wherein the step 2) specifically comprises: assuming that each of one or more first sensor nodes implements all-directional monitoring, its coverage is used as a circular area having a sensing radius of r, and each of the one or more first sensor nodes has the same transmitting power, that is, detection radii r of all the sensor nodes are equal; indirectly expressing a coverage density with distance a between the one or more first sensor nodes, increasing by adding second sensor nodes in six directions by taking the first sensor nodes as centers and the distances a between the second sensor nodes as side lengths of grids according to the different sensitivity levels of the geological CO2 storage area to perform regular triangulation on the geological CO2 storage area and satisfy a condition that if the sensitivity level of the geological CO2 storage area is higher, the distance a between the first and second sensor nodes is smaller.

5. The method for optimizing sensor network node location in geological CO2 storage area according to claim 4, wherein the step 3) comprises the following specific steps:
   a, constructing initial Delaunay triangulation with CO2 injection wells as cluster head nodes, and solving an initial Voronoi domain of the cluster head nodes;
   b, taking the cluster head nodes as initial growth points, selecting, according to the monitoring sensitivity level of an area where the initial growth points are located, the different distances a between the sensor nodes for grid arrangement, calculating spatial locations of to-be-increased sensor node point sets from six directions by taking equilateral triangles as grid division units and the initial growth points as centers, successively judging whether the to-be-increased sensor node point sets are within the Voronoi domain, adding the sensor nodes falling within the Voronoi domain into a growth point set, and performing sensitivity judgment again on the increased sensor nodes as new growth points till the to-be-increased sensor node point sets of all the growth nodes within the Voronoi domain are outside the Voronoi domain; and c, solving a Delaunay monitoring network optimization coverage control scheme in combination with the cluster head nodes and the sensor nodes.

* * * * *